US012681969B2

(12) United States Patent　　　(10) Patent No.:　US 12,681,969 B2
Kumar et al.　　　　　　　　　　　(45) Date of Patent:　　　Jul. 14, 2026

(54) METHOD AND SYSTEM FOR EVALUATING EFFECTIVENESS OF PROMPT

(71) Applicant: Accenture Global Solutions Limited, Dublin (IE)

(72) Inventors: Aditya Kumar, Kanpur (IN); Hemant Chandrakant Patil, Pune (IN); Sarang Padmakar Joshi, Pune (IN); Ninad Shashikant Kulkarni, Pune (IN); Niladri Sekhar Dutta, Howrah (IN); Karthik Ramesh, Bangalore (IN); Sailaja Bandi, Vijayawada (IN); Divya Dhar, Bangalore (IN); Srenik Ravjiani, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/981,192

(22) Filed: Dec. 13, 2024

(65) Prior Publication Data

US 2026/0170029 A1　　Jun. 18, 2026

(51) Int. Cl.
G06F 16/3332　　　(2025.01)
G06F 16/334　　　(2025.01)
(52) U.S. Cl.
CPC ...... G06F 16/3334 (2019.01); G06F 16/3344 (2019.01)
(58) Field of Classification Search
CPC ............. G06F 16/3334; G06F 16/3344; G06F 40/284; G06F 40/20; G06F 16/90332; G06F 40/40; G06F 40/30; G06F 16/3329; G06F 16/243; G06F 40/35; G06F 40/289; G06F 40/56; G06F 16/33295; G06F 16/24534

USPC .......................................................... 707/748
See application file for complete search history.

(56) References Cited

U.S. PATENT DOCUMENTS

2017/0075996 A1 *　3/2017　Azimi ................... G06F 16/951
2024/0184812 A1 *　6/2024　McDaniel .............. G06F 40/35
2025/0045256 A1 *　2/2025　Gottlob .............. G06F 16/2365
2025/0111203 A1 *　4/2025　Das .......................... G06N 3/08
2025/0173556 A1 *　5/2025　Ramarao ................ G06N 20/00
(Continued)

FOREIGN PATENT DOCUMENTS

CN　　119003576 A　* 11/2024　......... G06F 16/2433

*Primary Examiner* — Evan Aspinwall
(74) *Attorney, Agent, or Firm* — Seed Intellectual Property Law Group LLP

(57)　　　　　ABSTRACT

Method, system, and computer-readable storage media for evaluating effectiveness of a prompt are disclosed. Input data for generating the prompt is received. Based on the input data, sub-prompts are generated and each of the sub-prompts is evaluated. For evaluating a sub-prompt, a sub-response corresponding to the sub-prompt is generated, and an optimal score is computed for the sub-response. The optimal score value is computed for the sub-response by computing a score value for evaluation of each evaluation aspect of multiple evaluation aspects and computing a combined score value based on the score value computed for evaluation of each evaluation aspect. The optimal score value is compared with a predetermined threshold value. If the optimal score value exceeds the predetermined threshold value, the respective sub-prompt is determined as the most effective prompt for generating a response using a Large Language Model (LLM) corresponding to the input data.

14 Claims, 7 Drawing Sheets

(56)                    References Cited

U.S. PATENT DOCUMENTS

| | | | | |
|---|---|---|---|---|
| 2025/0278630 A1* | 9/2025 | Horesh | ................ | G06N 3/0895 |
| 2025/0316013 A1* | 10/2025 | Owen | ................ | G06F 16/9032 |
| 2025/0342360 A1* | 11/2025 | Varerkar | ................ | G06N 3/088 |
| 2026/0004078 A1* | 1/2026 | Krabach | ................ | G06F 40/30 |

* cited by examiner

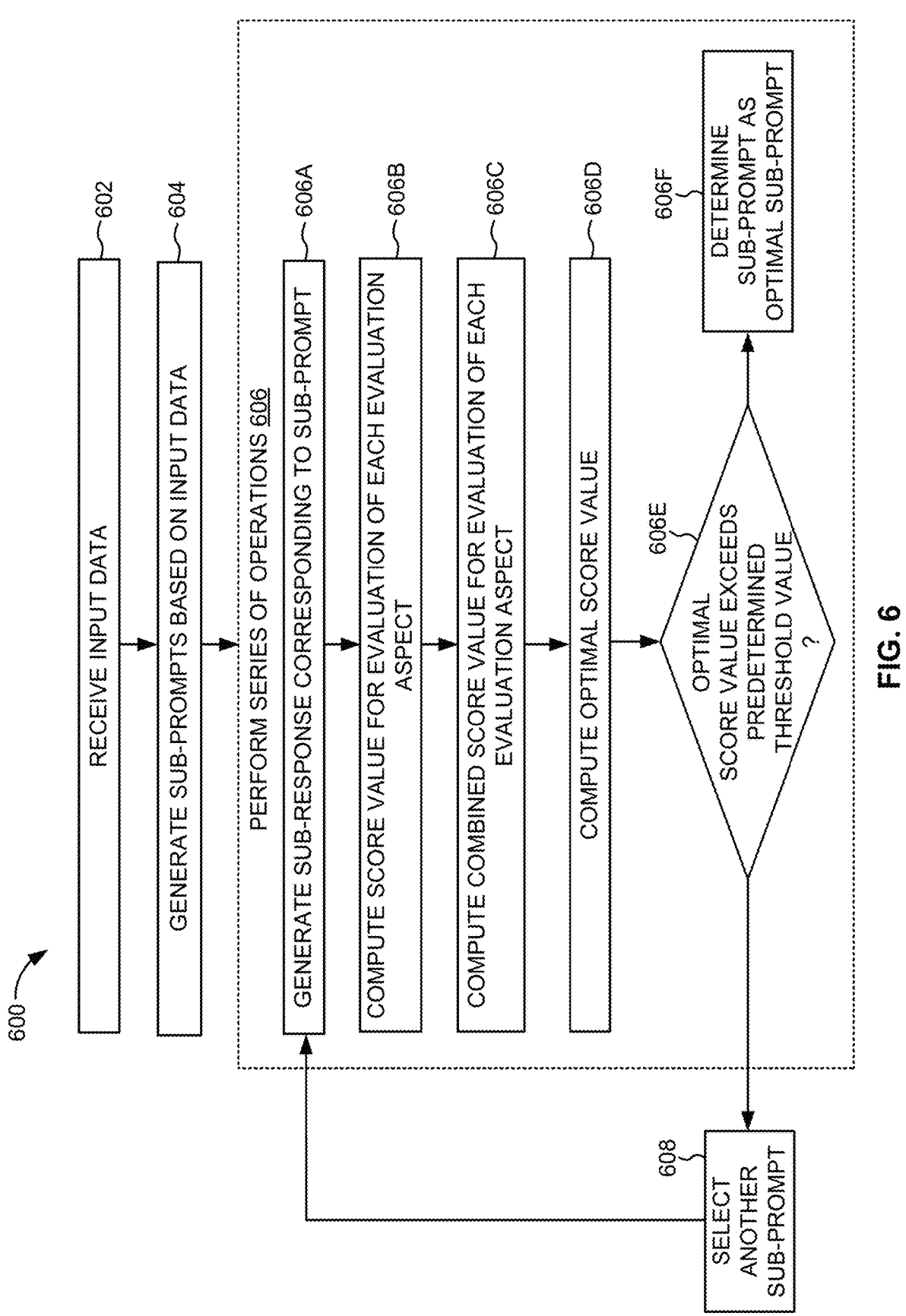

RECEIVE INPUT DATA — 602

GENERATE SUB-PROMPTS BASED ON INPUT DATA — 604

PERFORM SERIES OF OPERATIONS 606

GENERATE SUB-RESPONSE CORRESPONDING TO SUB-PROMPT — 606A

COMPUTE SCORE VALUE FOR EVALUATION OF EACH EVALUATION ASPECT — 606B

COMPUTE COMBINED SCORE VALUE FOR EVALUATION OF EACH EVALUATION ASPECT — 606C

COMPUTE OPTIMAL SCORE VALUE — 606D

OPTIMAL SCORE VALUE EXCEEDS PREDETERMINED THRESHOLD VALUE ? — 606E

DETERMINE SUB-PROMPT AS OPTIMAL SUB-PROMPT — 606F

SELECT ANOTHER SUB-PROMPT — 608

METHOD AND SYSTEM FOR EVALUATING EFFECTIVENESS OF PROMPT

TECHNICAL FIELD

Various examples described herein relate generally to method, system, and computer program product for evaluating effectiveness of a prompt.

BACKGROUND

Artificial Intelligence (AI) finds implementations in different use cases in the context of data processing. In the field of AI, Generative AI (GAI) has recently seen an explosion in popularity. GAI includes foundation models that generate a variety of content including, but not limited to, text, images, audio, and video based on training data. Examples of the foundation models include Large Language Models (LLMs), which are a form of GAI that can be used to generate text for a variety of use cases. In some examples, the LLMs can be integrated in digital assistants (e.g., chatbots) replacing traditional rule-based systems to provide responses to prompts received from a user.

SUMMARY

Implementations of the present disclosure enable a comprehensive evaluation of both a prompt and responses generated by the prompt. The comprehensive evaluation of the prompt may include measuring and scoring effectiveness of the prompt using prompt analysis techniques, for facilitating informed decision-making in prompt engineering and optimizing the prompt.

In at least one example, the present disclosure provides a computer-implemented method for evaluating effectiveness of a prompt. The method includes receiving input data for generating a prompt for receiving a response using a Large Language Model (LLM). Based on the input data, the method includes generating a plurality of sub-prompts. Each sub-prompt of the plurality of sub-prompts corresponds with the prompt for receiving the response using the LLM. The method further includes performing a series of operations for a sub-prompt of the plurality of sub-prompts. The series of operations includes (i) generating a sub-response corresponding to a sub-prompt using the LLM; (ii) computing a score value for evaluation of each evaluation aspect of a plurality of evaluation aspects corresponding to each respective matrix of a plurality of matrices; (iii) computing, based on the score value for evaluation of each evaluation aspect corresponding to each respective matrix, a combined score value for evaluation of each evaluation aspect; (iv) computing, based on the combined score value for evaluation of each evaluation aspect, an optimal score value corresponding to the sub-response; (v) determining whether the optimal score value corresponding to the sub-response exceeds a predetermined threshold value; and (vi) determining, based upon the optimal score exceeding the predetermined threshold value, the sub-prompt as the most effective prompt for generating the response using the LLM corresponding to the input data.

The present disclosure further describes a system for implementing the method provided herein. The present disclosure also describes a non-transitory computer-readable storage media having instructions stored thereon which, when executed by one or more processors of a computing device, cause the computing device to perform operations in accordance with the method described herein.

It is appreciated that method in accordance with the present disclosure can include any combination of the aspects and features described herein. That is, the method in accordance with the present disclosure is not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Various examples in accordance with the present disclosure will be described with reference to the drawings, in which:

FIG. 6 is a flow diagram that presents an example computer implemented method for evaluating effectiveness of the prompt, in accordance with implementations of the present disclosure.

Like reference numbers and designations in the various drawings indicate like elements.

DETAILED DESCRIPTION

Figure 1:
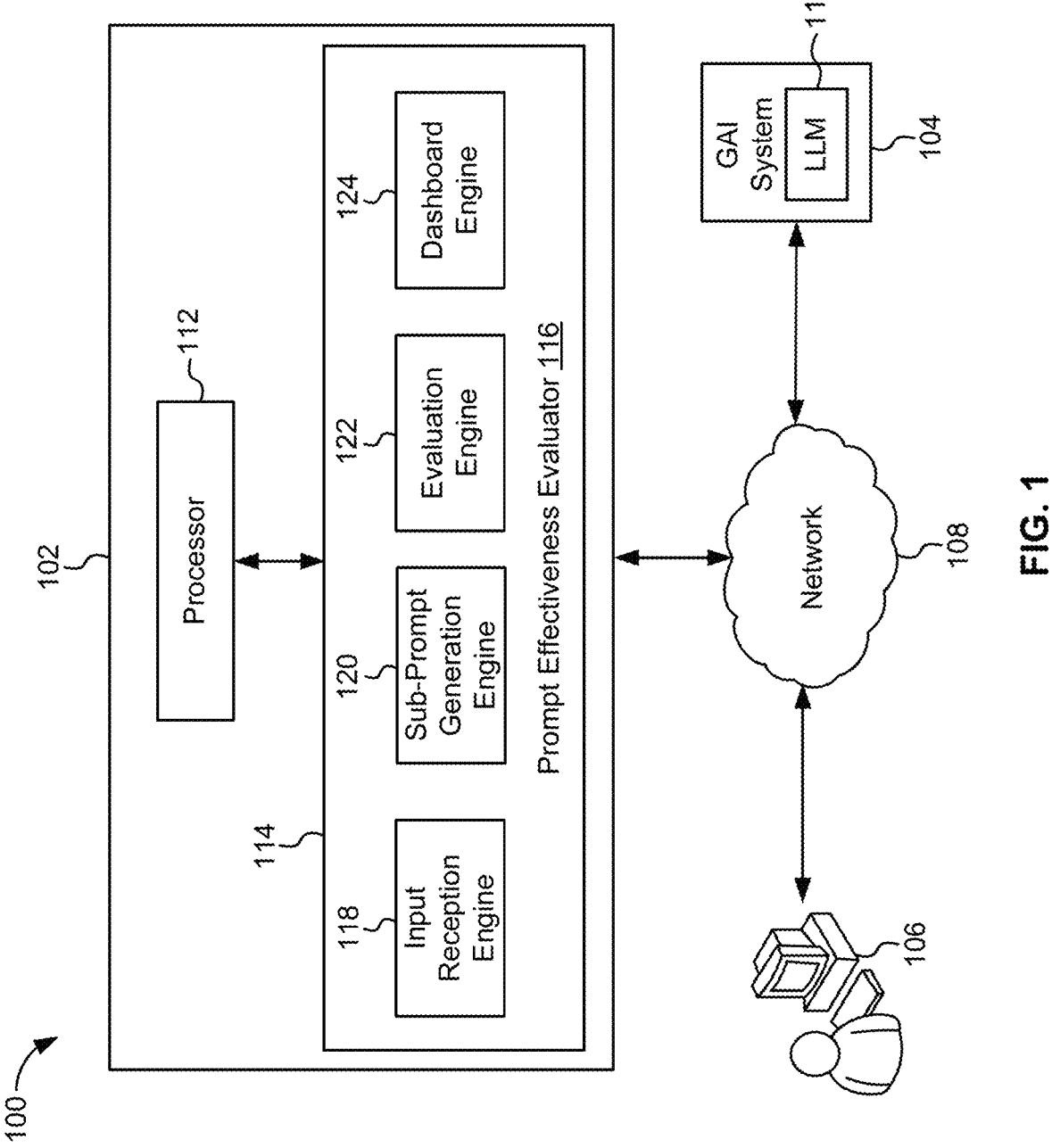
FIG. 1 depicts an example environment that may be used to execute implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Reference to any "example" herein (e.g., "for example," "an example of," "by way of example," or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring example examples.

The specification and drawings are to be regarded in an illustrative rather than a restrictive sense. It will, however, be evident that various modifications and changes may be made thereunto without departing from the broader spirit and scope as set forth in the claims.

With the advent of Generative Artificial Intelligence (GAI) systems, enterprises are adopting the GAI systems to support execution of various tasks or processes. For example, a GAI system may support communications and interactions, and processes in software systems to support decision-making within the enterprises. Multiple applications within an enterprise network environment may use and interact with foundation models or Large Language Models (LLMs) of the GAI systems to provide input and/or data for execution of a wide variety of tasks, such as, human computer interactions (e.g., question and answering), automating process execution, process planning, generating step-by-step procedures for the process execution, performing data analysis, and/or the like. Therefore, the LLMs have capability of Natural Language Processing (NLP) related tasks and processing unstructured data. Due to the LLM's capability of processing the unstructured data, the LLMs may be implemented for various domains and applications such as, software engineering, computational biology, healthcare or medicine, marketing, and/or the like.

A LLM may be provided with a prompt, which may be in a textual format that instructs the LLM to generate a desired response. Therefore, generating the desired response may depend on effectiveness of the prompt. However, evaluating the effectiveness of the prompt may be a non-trivial task.

In a known method of evaluating the effectiveness of the prompt, the prompt for performing a task and relevant data for performing the task may be received. The prompt may be used to generate responses from the LLM. The responses may indicate an outcome of the task performed using the LLM. The responses may be evaluated for measuring the effectiveness of the prompt. For example, once the responses are generated, scores may be calculated for the responses by evaluating the responses based on pre-defined metrics and criteria. The pre-defined metrics and criteria may rely on intuition or subjective assessments. The scores calculated for the responses may be aggregated and accordingly an overall prompt score may be generated. The overall prompt score may measure the effectiveness of the prompt in achieving the responses. If the overall prompt score includes a low prompt score, then the prompt may be refined based on manual or user intervention. Further, based on the refined prompt, the above-described steps of generating responses and evaluation of the responses may be iteratively performed until obtaining an optimal overall prompt score.

However, the above-described known method of evaluating the effectiveness of the prompt may have the following limitations, which may hinder efficiency and effectiveness of the prompt, while resulting in suboptimal results and decreasing progress of improving performance of the LLM.

Lack of quantitative measurement: The known method may lack a quantitative measurement (e.g., numerical evaluation) to evaluate the effectiveness of the prompt. For example, the known method may fail to consider any quantitative metrics to evaluate and calculate a score for the prompt (hereinafter referenced to as prompt score). Without the quantitative measurement or the prompt score, it may be challenging to objectively assess or evaluate different prompts and determine which prompts are more effective for specific tasks and to track improvements of the prompts over time.

Subjectivity in evaluation: Without the quantitative measurement, evaluating the effectiveness of the prompt may likely to be subjective and based on unreliable evidence or intuition rather than empirical data. Therefore, the known method of evaluating the effectiveness of the prompt may lead to inconsistencies in selecting and optimizing the prompt for a specific task.

Inefficient iterative engineering: Despite lacking the quantitative measurement, there may exist a need for an iterative process of prompt engineering. The iterative process of prompt engineering may involve refining and adjusting the prompt over multiple iterations to improve the effectiveness of the prompt gradually. However, without a clear understanding of how well each iteration performs, the iterative process of prompt engineering may be challenging and less efficient. In the known method, at each iteration, the user may be required to rely on a trial-and-error method or qualitative feedback to improve the effectiveness of the prompt, which may be time-consuming and/or less effective in achieving the desired responses from the prompt. In addition, each iteration may carry its own resource requirements. Due to which, the known method of evaluating the effectiveness of the prompt may consume considerable amount of energy and processing capacity.

Limited insights for improvement: Without the quantitative measurement, it may be challenging to identify specific areas for improvement in the prompt. The user may struggle to identify weaknesses or areas where adjustments in the prompt may lead to enhanced performance of the prompt.

Risk of suboptimal outcomes: Without the quantitative measurement and limited insights, there may be a high risk of settling for suboptimal prompt designs. The suboptimal prompt designs may result in underperformance of the prompt or may result in unexploited opportunities for improvement of the prompt.

Difficulty in benchmarking: Without the quantitative measurement, it may be challenging to benchmark the different prompts against each other or against external standards. This may hinder the ability to evaluate progress and compare performance of the different prompts across the multiple iterations.

Therefore, the known method of evaluating the effectiveness of the prompt may be characterized by ambiguity and subjectivity, with limited systematic and data-driven approaches. Due to which, the known method may expend a significant amount of time, human resources, and computing resources (e.g., processing resources, memory resources, communication resources, and/or the like) to evaluate and improve the effectiveness of the prompt.

Implementations of the present disclosure enable a quantitative way of evaluating the effectiveness of the prompt by leveraging a prompt score. The prompt score may be computed for the prompt based on multiple evaluation aspects. The prompt score may measure the effectiveness of the associated prompt in achieving the desired result and guide the iterative process of prompt engineering by indicating whether the associated prompt is effective for a specific task or not. Therefore, the effectiveness of the prompt may be efficiently evaluated with a reduced number of iterations and with reduced amount of computing resources, cost, and time.

FIG. 1 depicts an example environment 100 that may be used to execute implementations of the present disclosure. The example environment 100, depicted in FIG. 1, includes a system 102, a Generative Artificial Intelligence (GAI) system 104, and a user device 106. In the present disclosure, the system 102 may also be referenced to as a computing device, an effectiveness evaluation system, and/or the like. The system 102 may communicate with the GAI system 104 and the user device 106 using a network 108. In some examples, the network 108 may include a Local Area Network (LAN), a Wide Area Network (WAN), the Internet, or a combination thereof. In some examples, the network 108 may be accessed over a wired and/or a wireless communication link.

The GAI system 104 may include a Large Language Model (LLM) 110. In the present disclosure, the LLM 110 may also be referenced to as a foundation model, a GAI model, and/or the like. Also, for simplicity, the GAI system 104 including the LLM 110 is depicted in FIG. 1, however it should be noted that the GAI system 104 may include one or more LLMs. The LLM 110 may be a general-purpose GAI model like a large deep learning neural network, which may be trained using a broad range of generalized and unlabeled training data to perform one or more tasks, such as, human computer interactions (e.g., question and answering), automating process execution, process planning, generating step-by-step procedures for the process execution, performing data analysis, and/or the like. While implementations of the present disclosure are described in further detail herein with non-limiting reference to the LLM 110, it is contemplated that implementations of the present disclosure may be realized using any appropriate foundation models or Machine Learning (ML) models, or Artificial Intelligence (AI) models.

The user device 106 may be associated with a user. In some examples, the user device 106 may include a desktop, smartphones, laptops, a tablet, and/or the like. The user device 106 may present one or more user interfaces (e.g., Graphical User Interfaces (GUIs)) of a workspace for the user to interact with the system 102. The user device 106 may be used to provide input and/or receive output to/from the system 102. The input may include input data for generating a prompt, which may be used to receive a response from the LLM 110. The output may include the most effective prompt for generating the response using the LLM 110 corresponding to the input data.

The system 102 may be implemented as an on-premises system that is operated by an enterprise or a third-party engaged in cross-platform interactions and data management. In some examples, the system 102 may be implemented as an off-premises system (for example, cloud or on-demand) that is operated by an enterprise or a third-party on behalf of an enterprise. In some examples, the system 102 may be implemented in a cloud environment. For simplicity, the system 102 depicted in FIG. 1 may be a cloud environment that is intended to represent various forms of servers including a web server, an application server, a proxy server, a network server, a server pool, and/or the like.

In some examples, the system 102 may be implemented by way of a single device or a combination of multiple devices that may be operatively connected or networked together. The system 102 may be implemented in hardware or a suitable combination of hardware and software. The "hardware" may include a combination of discrete components, an integrated circuit, an application-specific integrated circuit, a field-programmable gate array, a digital signal processor, or other suitable hardware. The "software" may include one or more objects, agents, threads, lines of code, subroutines, separate software applications, two or more lines of code, or other suitable software structures operating in one or more software applications.

Still referring to FIG. 1, the system 102 includes a processor 112 and a memory 114 communicably coupled to the processor 112. The processor 112 may include one or more processors. Examples of the processor 112 may include, but are not limited to, microprocessors, microcomputers, microcontrollers, digital signal processors, central processing units, state machines, logic circuits, and/or any devices that manipulate data or signals based on operational instructions. Among other capabilities, the processor 112 may fetch instructions (also be referenced to as processor-executable instructions) from the memory 114 and execute the fetched instructions for performing operations according to the present disclosure. The memory 114 may be non-volatile or non-transitory computer-readable medium (CRM), such as a magnetic disk or solid-state non-volatile memory or volatile medium such as Random Access Memory (RAM), and/or the like.

Further, the system 102 includes a prompt effectiveness evaluator 116. The prompt effectiveness evaluator 116 may be stored in the memory 114 and provided as a downloadable library including the instructions. The prompt effectiveness evaluator 116 includes an input reception engine 118, a sub-prompt generation engine 120, an evaluation engine 122, and a dashboard engine 124. The processor 112 may execute the components 118-124 of the prompt effectiveness evaluator 116 to perform intended functions according to the present disclosure (described in detail below).

In an example implementation, the processor 112 may execute the input reception engine 118 to receive input data. The input data may be received from the user device 106 via the network 108. The input data may be for generating a prompt for receiving a response using the LLM 110.

In an example implementation, the processor 112 may execute the sub-prompt generation engine 120 to generate sub-prompts. The sub-prompt generation engine 120 may generate the sub-prompts based on the input data. Each of the sub-prompts may correspond with the prompt for receiving the response using the LLM 110.

In an example implementation, the processor 112 may execute the evaluation engine 122 to evaluate effectiveness of each of the sub-prompts and determine one of the sub-prompts as the most effective prompt for generating the response using the LLM 110 corresponding to the input data. In the present disclosure, the effectiveness of a sub-prompt may indicate how effective the sub-prompt is in generating the response.

In an example implementation, the processor 112 may execute the dashboard engine 124 to provide an output on the user interface of the user device 106. The output may indicate the most effective prompt determined for generating the response using the LLM 110 corresponding to the input data.

Various examples depicting evaluating effectiveness of the prompt is described in detail in conjunction with FIGS. 2-7.

Figure 2:
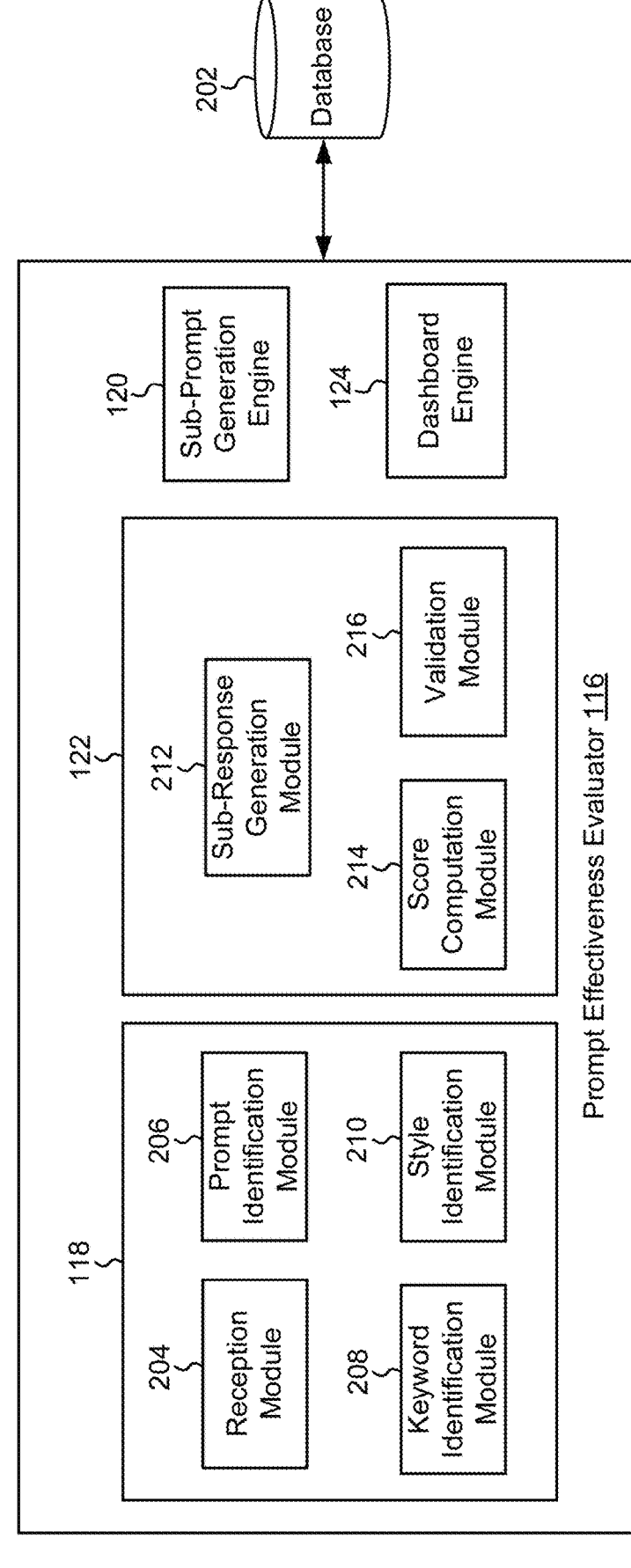
FIG. 2 depicts an example conceptual architecture of a prompt effectiveness evaluator for evaluating effectiveness of a prompt in achieving a desired response, in accordance with implementations of the present disclosure.

FIG. 2 depicts an example conceptual architecture 200 of the prompt effectiveness evaluator 116 for evaluating the effectiveness of the prompt in achieving the desired response, in accordance with implementations of the present disclosure. In some examples, as depicted in FIG. 2, the prompt effectiveness evaluator 116 may be communicatively coupled with a database 202, which may store various data and intermediate results generated by the input reception engine 118, the sub-prompt generation engine 120, the evaluation engine 122, and the dashboard engine 124.

The input reception engine 118 includes a reception module 204, a prompt identification module 206, a keyword identification module 208, and a style identification module 210.

The reception module 204 may receive the input data from the user device 106 (as depicted in FIG. 1). The input data may be received for generating a response using the LLM 110 of the GAI system 104 (as depicted in FIG. 1). In some examples, the reception module 204 may receive the input data from the user device 106 through various modalities including, but are not limited to, a question input to a chat bot, a request provided through a GUI, and/or the like.

The prompt identification module 206 may identify a prompt (also be referenced to as an initial prompt) from the received input data. The prompt may include query information for generating the response using the LLM 110. The query information may include instructions and/or contextual information for generating the response. In some examples, the query information may be in a textual format.

The keyword identification module 208 may identify preferred keywords and respective weightages from the input data. In some examples, the preferred keywords and the respective weightages may be specified by the user (associated with the user device 106) in the input data. The preferred keywords may identify words to be present in the response. The weightages of the preferred keywords may indicate importance of the respective preferred keywords in the response.

The style identification module 210 may identify a preferred response style from the input data. In some examples, the preferred response style may be specified by the user in the input data. The preferred response style may identify a style of the response expected from the user. Examples of the preferred style may include, but are not limited to, a professional response style, a creative response style, a friendly response style, and/or the like.

Therefore, the received input data may include the prompt, the preferred keywords and the respective weightages, and the preferred response style. The received input data may be stored in the database 202.

Once the input data is received, the sub-prompt generation engine 120 may generate sub-prompts based on the input data. The sub-prompts may capture different variations of the prompt received in the input data. For example, consider a scenario wherein a prompt 1 is received in the input data. In such a scenario, multiple sub-prompts such as a sub-prompt 1, a sub-prompt 2, and a sub-prompt 3 may be generated by capturing the different variations of the prompt 1. In some examples, the sub-prompt generation engine 120 may process the input data using the LLM 110 to generate the sub-prompts. The sub-prompts may be stored in the database 202. The LLM 110 may be a LLM selected from the one or more LLMs included in the GAI system 104 (depicted in FIG. 1). In some examples, the LLM 110 may be a pre-trained LLM and may be fine-tuned through prompt engineering for generating the sub-prompts.

The evaluation engine 122 may evaluate the effectiveness of each of the sub-prompts in generating the response and determines the most effective prompt for generating the response using the LLM 110. The evaluation engine 122 includes a sub-response generation module 212, a score computation module 214, and a validation module 216. It should be noted that the sub-response generation module 212, the score computation module 214, and the validation module 216 may be iteratively operated in conjunction with each other for evaluating effectiveness of each of the sub-prompts. For simplicity, evaluating effectiveness of a sub-prompt (e.g., a single sub-prompt) is described in detail below, however it should be noted that the same evaluation may be applicable for all the sub-prompts.

The sub-response generation module 212 may generate a sub-response corresponding to the sub-prompt using the LLM 110. In some examples, the generated sub-response may include a short (e.g., a few lines of response) and/or long text of response.

Once the sub-response is generated, the score computation module 214 may compute an optimal score value corresponding to the sub-response. The optimal score value of the sub-response may measure the effectiveness of the sub-prompt corresponding to the respective sub-response. An example process flow 300 of computing the optimal score value by the score computation module 214 is described in detail along with FIG. 3.

Figure 3:
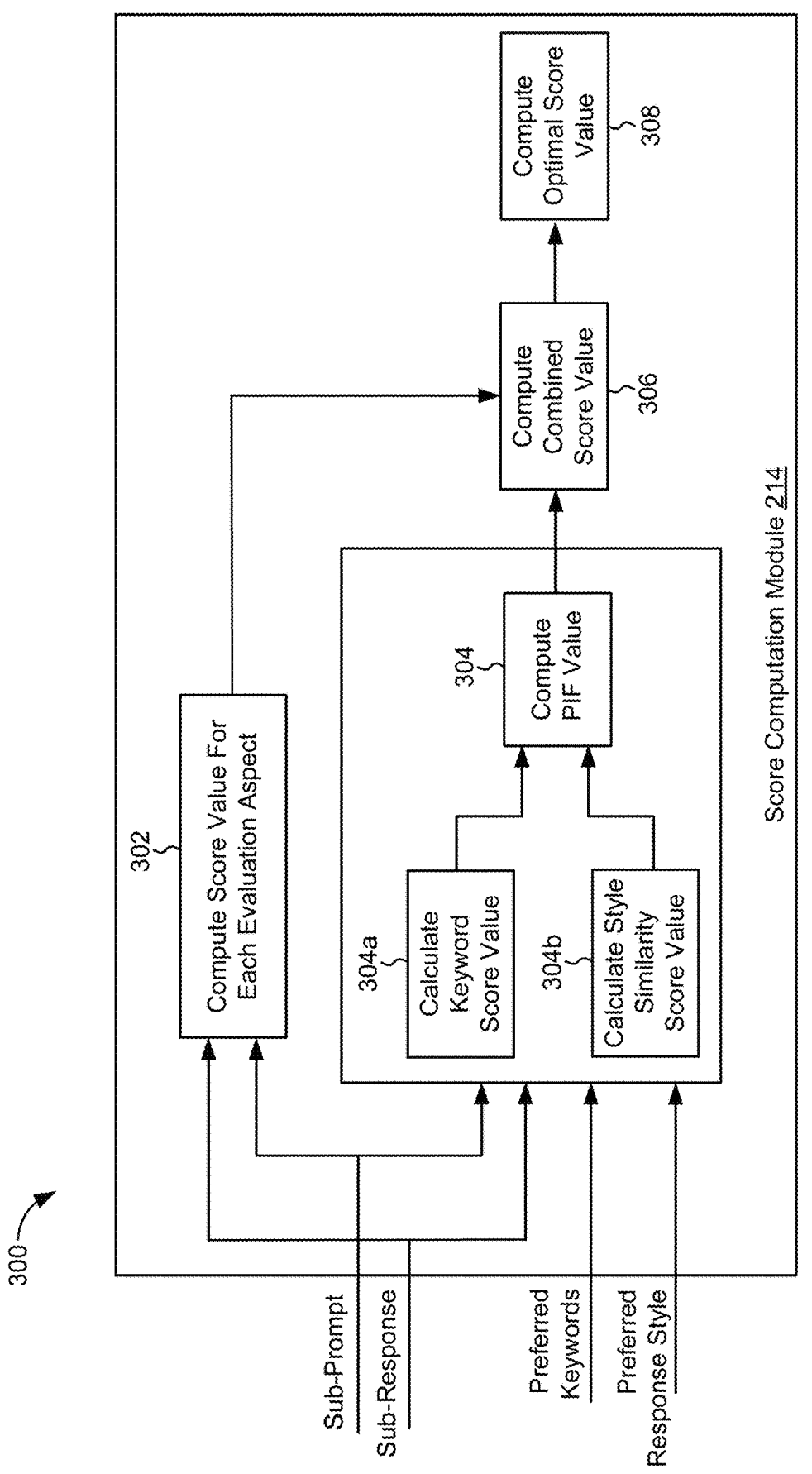
FIG. 3 depicts an example process flow of computing an optimal score value, in accordance with implementations of the present disclosure.

As depicted in FIG. 3, for computing the optimal score value, the score computation module 214 may compute a score value 302 for evaluation of each evaluation aspect of evaluation aspects (also be referenced to as evaluation metrics) corresponding to each respective matrix of matrices. Examples of the evaluation aspects may include, but are not limited to, clarity, relevance, hallucination, prompt token size, domain knowledge, consistency, and/or the like. It is contemplated that implementations of the present disclosure may be realized with any appropriate number and type of evaluation aspects (including the above-described evaluation aspects).

The score value 302 computed for evaluation of the clarity (also be referenced to as clarity score) may indicate whether the sub-prompt is clear and specific. In some examples, the score computation module 214 may calculate the score value 302 for the clarity by performing similarity calculation on the sub-response and a ground-truth response and token size calculation. The ground-truth response may be a sample response generated and stored for the sub-prompt in the database 202. In some examples, the similarity calculation may be performed using a combination of similarity metrics. By way of a non-limiting example, the similarity metrics may include a cosine similarity metric and a Jaccard similarity metric. The cosine similarity metric may be used to capture a semantic similarity in dense vector representations of the sub-response and the ground-truth response. The Jaccard similarity metric may be used to capture a set-based similarity by considering token overlaps in the sub-response and the ground-truth response. The token size calculation may involve determining a size or length of the sub-response based on a number of words or tokens present in the sub-response. In the present disclosure, the size or length of the sub-response may be referenced to as token size. Therefore, the clarity score may be computed by performing the similarity calculation and the token size calculation, which may effectively address different aspects of text similarity as well as the token size of the sub-response.

The score value 302 computed for evaluation of the relevance (also be referenced to as relevance score) may indicate whether the sub-response generated corresponding to the sub-prompt captures all the preferred keywords (indicated in the input data) without ambiguity. In some examples, the score value 302 for the relevance may be computed using a Bilingual Evaluation Understudy (BLEU) score of a natural language tool kit library.

The score value 302 computed for evaluation of the hallucination (also be referenced to as hallucination score) may indicate whether the sub-response generated corresponding to the sub-prompt is relevant and contextually accurate. In some examples, the score value 302 for the hallucination may be computed using cross encoders of a sentence transformer library. The score value 302 computed for the hallucination using the cross encoders may indicate a similarity between the sub-response and the ground truth response.

The score value 302 computed for evaluation of the prompt token size (also be referenced to as token score) may indicate whether a length of the sub-prompt concise to avoid token limit issues. The token limit issues may be occurred when a number of tokens or words in the sub-prompt exceeds a predefined token threshold (e.g., predefined upper token limit). In some examples, the score value for the prompt token size may be computed using any suitable open-source token library.

The score value 302 computed for evaluation of the domain knowledge (also be referenced to as domain score) may indicate whether the sub-response generated corresponding to the sub-prompt showcases a knowledge of a domain identified from the sub-prompt. The domain may indicate a use case or an application which requires implementation of the LLM 110 to generate the response by performing the tasks. Examples of the domain may include, but are not limited to, software development, healthcare, retail industries (including enterprise applications), industrial equipment, and so on. In some examples, the score value 302 for the domain knowledge may be computed using Latent Semantic Analysis (LSA). In accordance with the LSA, the score computation module 214 may convert the sub-response and an associated domain reference text (e.g., the ground-truth response stored in the database 202 for the sub-prompt) into a term-document matrix. The score computation module 214 may further decompose the term-document matrix by reducing dimensions of the term-document matrix using a Singular Value Decomposition (SVD). The score computation module 214 may use the cosine similarity metric to evaluate a similarity of a semantic space between the sub-response and the domain reference text while considering the decomposed term-document matrix. Based on evaluation of the similarity, the score computation module 214 may compute the score value 302 for the domain knowledge.

The score value 302 computed for evaluation of the consistency (also be referenced to as consistency score) may indicate whether the sub-response generated corresponding to the sub-prompt is consistent with the preferred response style. In some examples, the score value 302 for the consistency may be computed based on a keyword consistency score and a semantic consistency score. The keyword consistency score may be computed using the Jaccard similarity metric and the semantic consistency score may be computed using the cosine similarity metric.

Therefore, in the present disclosure, the score value 302 may include the clarity score, the relevance score, the hallucination score, the token score, the domain score, the consistency score, and/or the like.

Once the score value 302 is computed, the score computation module 214 may compute a performance improvement factor (PIF) value 304 (also be referenced to as prompt improvement factor) for the sub-prompt.

In an implementation, the performance improvement factor value 304 may be computed based on a keyword score value 304*a* and a style similarity score value 304*b*. The keyword score value 304*a* may be computed by analyzing the sub-response generated corresponding to the sub-prompt against the preferred keywords identified from the input data. To illustrate, the keyword score value 304*a* may be computed based on occurrence of the preferred keywords in the sub-response and the respective weightages and semantic meanings of the preferred keywords. Thereby, the preferred keywords may be assigned with more preference while evaluating the sub-prompt. The style similarity score value 304*b* may be computed by analyzing the sub-response generated corresponding to the sub-prompt against the preferred response style identified from the input data. To illustrate, the score computation module 214 may analyze the sub-response to determine a similarity of the sub-response to the preferred response style. Based upon the determined similarity, the score computation module 214 may compute the style similarity score value 304*b*. The keyword score value 304*a* and the style similarity score value 304*b* may be used to compute the performance improvement factor value 304. Therefore, the performance improvement factor value 304 may indicate whether improvements are required for the sub-prompt in terms of keywords or a response style.

Based on the score value 302 computed for evaluation of each evaluation aspect, and the performance improvement factor value 304 of the sub-prompt, the score computation module 214 may compute a combined score value 306 for evaluation of each evaluation aspect. In an example, the combined score value 306 for evaluation of the clarity may be computed as:

$$\text{Combined score value(clarity)} = ((\alpha * \text{cosine}_{similarity_{score}}) + (\beta * \text{jaccard}_{similarity_{score}}) + (1-\alpha-\beta)* \text{(keyword score value+style similarity score value)})$$

wherein, '$((\alpha * \text{cosine}_{similarity_{score}}) + (\beta * \text{jaccard}_{similarity_{score}}) + (1-\alpha-\beta))$' indicates the score value 302 computed for evaluation of the clarity based on the similarity calculation and '(keyword score value+style similarity score value)' indicates the performance improvement factor value 304 computed for the sub-prompt.

Figure 4:
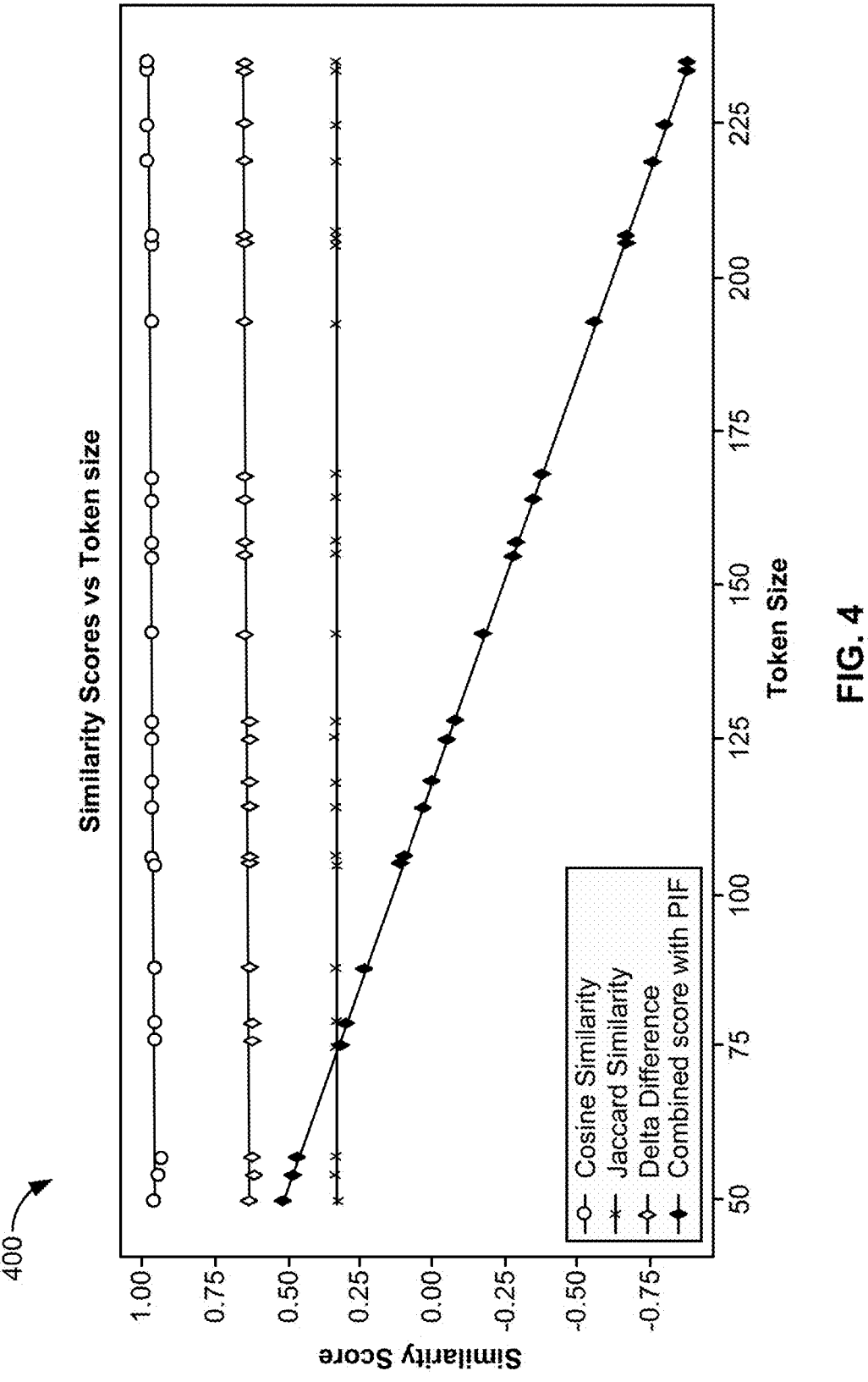
FIG. 4 depicts an example graph illustrating computation of a combined score value for evaluation of clarity, in accordance with implementations of the present disclosure.

After computing the combined score value 306 for evaluation of each evaluation aspect, the score computation module 214 may compute the optimal score value 308 for the sub-response generated corresponding to the sub-prompt. The optimal score value 308 may be computed by aggregating combined score values computed for evaluation of the evaluation aspects. Thereby, the optimal score value 308 may be act as an overall effectiveness score computed by considering the multiple evaluation aspects. An example graph 400 illustrating computation of the combined score value for evaluation of the clarity is depicted in FIG. 4. As depicted in FIG. 4, the score value 302 for evaluation of the clarity may be computed based on the token size calculation, the cosine similarity metric, and the Jaccard similarity metric. Further, the combined score value for the clarity may be computed based on the score value 302 and the performance improvement factor value 304.

Referring back to FIG. 2, upon computing the optimal score value 308 for the sub-response corresponding to the sub-prompt, the validation module 216 may determine whether the optimal score value 308 exceeds a predetermined threshold value. In some examples, the threshold value may be predetermined based on number and type of evaluation aspects used for evaluation of the sub-prompts. By way of a non-limiting examples, the predetermined threshold value may vary from 7 to 10.

When it has been determined that the optimal score value 308 of the sub-response does not exceed the predetermined threshold value (e.g., the optimal score value 308 is greater than '0' and lesser than '7'), the validation module 216 may determine that the sub-prompt may require improvement in terms of one or more evaluation aspects. Based on determining that the sub-prompt requires improvement, the validation module 216 may generate feedback for further refining or auto tuning of the sub-prompt. The feedback may be generated based on the optimal score value 308 and/or the combined score value 306 computed for evaluation of each of the evaluation aspect. The feedback may be in a textual format and may indicate improvements required in the sub-prompt in terms of the evaluation aspects, for example, the clarity, the relevance, the consistency, the prompt token size, the hallucination, the domain knowledge, and/or the like. In an example, the feedback generated for the sub-prompt (herein referenced to as prompt) may indicate: "Modify the prompt by considering below evaluation aspects (e.g., improvement areas):
  1. Improve the clarify of the prompt. It should indicate a clear purpose.

2. Ensure to minimize the hallucination by not providing any creative answers. Instead focus on the topic itself and add some more context or example.
  3. Sub-prompt: suggest me some pocket friendly tourist location near India in one line."

Alternatively, or additionally, the validation module 216 may assign a grade for the sub-prompt. The grade may be assigned for the sub-prompt based on a comparison of the optimal score value 308 with the predetermined threshold value. In some examples, the grade assigned for the sub-prompt may be included in the feedback generated for the sub-prompt.

Further, the validation module 216 may enable the sub-prompt generation engine 120, the sub-response generation module 212 and the score computation module 214 to iteratively perform respective steps of: refining or auto tuning, using the LLM 110, the sub-prompt based on the feedback, and/or the grade, and/or the optimal score value 308, performing regeneration of a sub-response for the refined or auto tuned sub-prompt, and evaluating the refined or auto tuned sub prompt and the corresponding sub-response to compute the optimal score value 308, until the optimal score value 308 computed for the sub-response exceeds the predetermined threshold value or for a number of predefined iterations. In some examples, the sub-prompt generation engine 120 may provide the feedback to the LLM 110 in a form of prompt for refining or auto tuning the sub-prompt. At each iteration of evaluation, the sub-prompt may be refined or auto tuned using the LLM 110. In some examples, the sub-prompt may be refined or auto tuned by refining coverage, structure, and occurrence of the preferred keywords, in accordance with the feedback. In some implementations, at each iteration of evaluation, the token size of the sub-prompt may be reduced before providing the feedback to the LLM 110 for refining or auto tuning the sub-prompt. In some examples, the token size of the sub-prompt may be reduced by removing unnecessary punctuations in the sub-prompt, and/or removing redundancy of vowels in the sub-prompt, and/or preserving the same semantic meaning of the sub-prompt while reducing redundant words in the sub-prompt. Alternatively, or additionally, a benchmark of each iteration may be monitored and stored in the database 202. The benchmark may indicate the token size of the sub-prompt, usage of computing resources (e.g., usage of a Graphical Processing Unit (GPU) or a Central Processing Unit (CPU), usage of the memory, and/or the like), and/or the like. Therefore, the sub-prompt may be considered for refining or auto-tuning in a subsequent iteration, only if the sub-prompt is associated with an improved benchmark when compared to the monitored benchmark of a previous iteration. Thereby, evaluation of the sub-prompt may be iteratively and effectively performed to optimize performance of the sub-prompt.

When it has been determined that the optimal score value 308 does not exceed the predetermined threshold value even after the number of predefined iterations, another sub-prompt from the generated sub-prompts may be selected and the selected another sub-prompt may be evaluated for the effectiveness, by performing the above-described steps using the sub-response generation module 212, the score computation module 214, and the validation module 216.

When it has been determined that the optimal score value 308 of the sub-response exceeds the predetermined threshold value (e.g., the optimal score value 308 is equal to or greater than '7' and lesser than '10'), the validation module 216 may determine that the respective sub-prompt as the most effective prompt for generating the response using the LLM 110.

The dashboard engine 124 may display the sub-prompt determined as the most effective prompt on the user interface of the user device 106. The sub-prompt determined as the most effective prompt may be used for generating the response using the LLM 110, which may improve a quality of the response.

Figure 5:
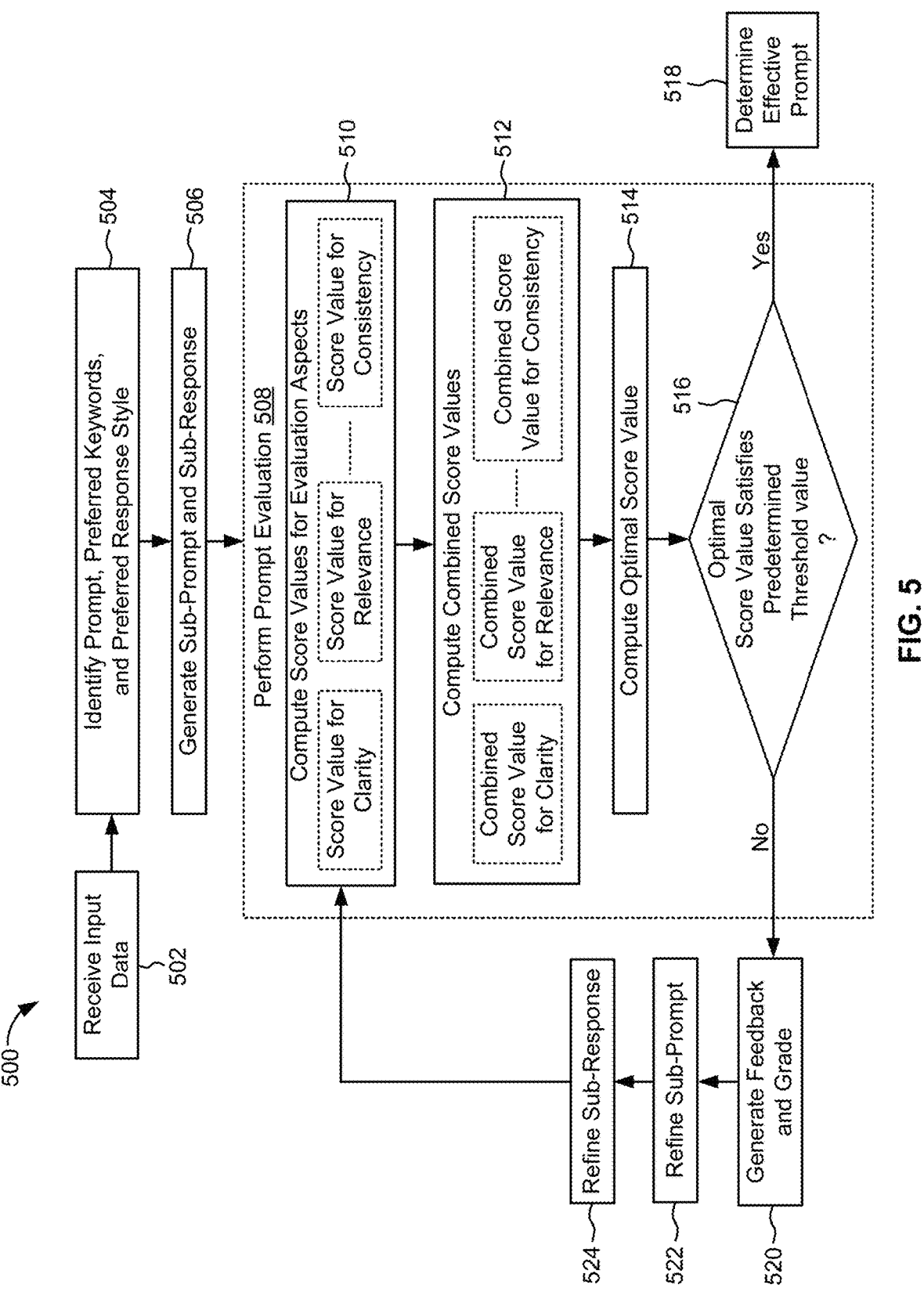
FIG. 5 depicts an example process flow of performing analysis of the prompt for measuring and scoring the effectiveness of the prompt in achieving optimal performance, in accordance with implementations of the present disclosure.

FIG. 5 depicts an example process flow 500 of performing analysis of the prompt for measuring and scoring the effectiveness of the prompt in achieving optimal performance, in accordance with implementations of the present disclosure. The process flow 500 may be executed using the prompt effectiveness evaluator 116, as described in relation to FIGS. 1-3.

The prompt effectiveness evaluator 116 may receive 502 the input data from the user device 106 associated with the user. From the input data, the prompt effectiveness evaluator 116 may identify 504 the prompt and/or query information, the preferred keywords, and the preferred response style. Based on the input data, the prompt effectiveness evaluator 116 may generate 506 a sub-prompt and a sub-response for the sub-prompt using the LLM 110 (depicted in FIG. 1).

Upon generating the sub-prompt and the corresponding sub-response, the prompt effectiveness evaluator 116 may initiate performing 508 prompt evaluation for evaluating effectiveness of the sub-prompt in generating the sub-response. To illustrate, the prompt effectiveness evaluator 116 may compute 510 score values for evaluation of evaluation aspects such as, clarity, relevance, consistency, prompt token size, hallucination, domain knowledge, and/or the like. The prompt effectiveness evaluator 116 may further compute 512 combined score values for evaluation of the evaluation aspects. A combined score value for evaluation of each evaluation aspect may be computed based on a score value computed for each evaluation aspect and a performance improvement factor value computed for the sub-prompt. Once the combined score values for evaluation of the evaluation aspects are computed, the prompt effectiveness evaluator 116 may compute 514 an optimal score value for the sub-response generated corresponding to the sub-prompt. The optimal score value may be computed by aggregating the combined score values computed for evaluation of the evaluation aspects. Once the optimal score value is computed for the sub-response, the prompt effectiveness evaluator 116 may validate 516 if the optimal score value computed for the sub-response satisfies the predetermined threshold value.

If the optimal score value satisfy the predetermined threshold value (e.g., if the optimal score value is equal to or greater than the predetermined threshold value), the prompt effectiveness evaluator 116 may determine 518 the respective sub-prompt as the most effective prompt for generating the response using the LLM 110.

If the optimal score value does not satisfy the predetermined threshold value (e.g., if the optimal score value is lesser than the predetermined threshold value), the prompt effectiveness evaluator 116 may generate 520 feedback and a grade for the sub-prompt based on the optimal score value computed for the corresponding sub-response. Based on the generated feedback and grade, the prompt effectiveness evaluator 116 may iteratively perform steps of refining 522 the sub-prompt, refining 524 a sub-response for the refined sub-prompt and performing 508 the prompt evaluation to compute the optimal score value for the sub-response, until the optimal score value for the sub-response satisfies the predetermined threshold value.

If the optimal score value computed for the sub-response does not satisfy the predetermined threshold value after performing the predefined number of iterations, the prompt effectiveness evaluator 116 may select another sub-prompt and perform evaluation of another sub-prompt by performing 508 the prompt evaluation.

For example, consider a scenario wherein the prompt effectiveness evaluator 116 receives the input data including:

Prompt: "suggest me some pocket friendly tourist location near Country A in one line"

Preferred keywords: affordable—0.3, exploring—0.3, Country A—0.5

Preferred response style: professional response style

In such a scenario, the prompt effectiveness evaluator 116 generates sub-prompts and corresponding sub-responses using the LLM 110. For example, a sub-prompt 1, a sub-prompt 2, and a sub-prompt 3 may be generated as the sub-prompts. The sub-responses generated for the sub-prompts 1, 2, and 3 may respectively include:

Sub-response 1: "For an affordable and memorable trip near Country A, consider exploring the cultural riches of Country B."

Sub-response 2: "Explore affordable destinations near Country A such as Country B, where you can experience rich culture and beautiful beaches."

Sub-response 3: "Affordable travel options near Country A include Country B, perfect for exploring ancient temples and enjoying pristine beaches".

Upon generating the sub-prompts and the sub-responses, the prompt effectiveness evaluator 116 initiates evaluation of the sub-prompt 1 and the corresponding sub-response 1 to compute an optimal score value for the sub-prompt 1. From the evaluation, the prompt effectiveness evaluator 116 computes the optimal score value for the sub-prompt 1 as 5. As the optimal score value is lesser than the predetermined threshold value (e.g., 0.7), the prompt effectiveness evaluator 116 may generate feedback based on the optimal score value. The feedback may indicate "Increase emphasis on a keyword "Country A" and ensure the response remains professional response style." Based on the feedback, the prompt effectiveness evaluator 116 uses the LLM 110 and refines or tunes the sub-prompt 1 as "Suggest an affordable and enriching travel destination near Country A that offers diverse cultural experiences and beautiful landscapes in a professional tone". Based on the refined sub-prompt 1, the prompt effectiveness evaluator 116 uses the LLM 110 and regenerates or refines the sub-response 1 for the refined sub-prompt 1 as "For an affordable and enriching travel experience near Country A, consider exploring the diverse attractions of Sri Lanka". Further, the prompt effectiveness evaluator 116 evaluates the refined sub-prompt 1 and the corresponding refined sub-response 1 and accordingly computes the optimal score value for the refined sub-prompt 1 as 9. As the optimal score value is greater than the predetermined threshold value, the prompt effectiveness evaluator 116 determines the refined sub-prompt 1 as the most effective prompt for generating the response. The refined sub-prompt 1 may be provided as an output to the user device 106 and may be further used for generating the response using the LLM 110. Therefore, the proposed methodology may indicate the prompt suitable for a specific response or task. Usage of the most effective prompt may improve efficiency and quality of the response, while reducing number of iterations required for generating the efficient and quality response.

FIG. 6 is a flow diagram that presents an example computer implemented method 600 for evaluating effectiveness of the prompt, in accordance with implementations of the present disclosure. In some implementations, the method 600 may be executed by the processor 112 (including the one or more processors) using the prompt effectiveness evaluator 116, as described in relation to FIGS. 1-5.

The method 600 includes receiving 602 input data for generating a prompt for receiving a response using the LLM 110 (depicted in FIG. 1). In some examples, the input data may include preferred keywords, a respective weightage for each preferred keyword and query information. Alternatively, or additionally, the input data may also include a preferred response style. In some examples, the preferred response style may include one of: a professional response style, a creative response style, or a friendly response style.

Based on the input data, the method 600 includes generating 604 sub-prompts. Each sub-prompt of the sub-prompts may correspond with the prompt for receiving the response using the LLM 110. The sub-prompts may be generated using the LLM 110.

Upon generating 604 the sub-prompts, the method 600 further includes performing 606 a series of operations (606A-606F) for a sub-prompt of the sub-prompts. The series of operations may include generating 606A a sub-response corresponding to the sub-prompt using the LLM 110. Upon generating the sub-response, the method 600 includes computing 606B a score value for evaluation of each evaluation aspect of evaluation aspects corresponding to each respective matrix of matrices. Examples of the evaluation aspects may include, but are not limited to, clarity, relevance, hallucination, domain knowledge, consistency, and/or the like. Computing the score value for evaluation of each evaluation aspect is described in detail in conjunction with FIGS. 2 and 3, therefore repeated description is omitted herein for sake of brevity.

Based on the score value generated for evaluation of each evaluation aspect, the method 600 includes computing 606C a combined score value for evaluation of each evaluation aspect. In some examples, for computing 606C the combined score value, a performance improvement factor value for the sub-prompt may be computed based upon a keyword score value and a style similarity score value. For computing the keyword score value, the sub-response may be analyzed to determine presence of the preferred keywords and the respective weightage assigned to each preferred keyword. Based on the preferred keywords and the respective weightage assigned to each preferred keyword, the keyword score value may be computed. For computing the keyword score value, the sub-response may be analyzed to determine similarity of the sub-response to the preferred response style. Based upon the determined similarity, the style similarity score value may be computed. Once the performance improvement factor value for the sub-prompt is computed, the combined score value for evaluation of each evaluation aspect may be computed based on the performance improvement factor value and the respective score value of each evaluation aspect. Further, based on the combined score value, the method 600 includes computing 606D an optimal score value for the sub-response generated corresponding to the sub-prompt. The optimal score value may indicate effectiveness of the respective sub-prompt in generating the corresponding sub-response.

Upon computing 606D the optimal score value, the method 600 includes determining 606E whether the optimal score value computed for the sub-response exceeds a predetermined threshold. When it has been determined that the optimal score value computed for the sub-response exceeds the predetermined threshold value, the method includes 606F determining the respective sub-prompt as the most effective prompt for generating the response using the LLM 110 corresponding to the input data. When it has been determined that the optimal score value computed for the sub-response fails to exceed the predetermined threshold value, the method 600 includes selecting 608 another prompt and repeating performing 606 the series of operations (606A-606E) for another selected prompt.

Implementations of the present disclosure provide technical solutions to multiple technical problems that arise in the context of evaluation of prompts. Implementations of the present disclosure provide a comprehensive mechanism for evaluating and optimizing a prompt intended for generating a response using an LLM. The comprehensive mechanism disclosed herein may consider multiple factors such as, multiple evaluation aspects, a performance improvement factor value, and prompt compression and benchmarking, and/or the like, for evaluating the prompt. Such a comprehensive mechanism may provide precise, scalable, and contextually relevant evaluations for prompt, making the prompt adaptable to a wide range of use cases or tasks.

Considering the multiple evaluation aspects may provide accurate measurement of clarity and relevancy of the prompt. Further, the clarity of the prompt may be accurately measured by performing a similarity calculation based on a cosine similarity metric and a Jaccard similarity metric. Using such similarity metrics, robustness and adaptability may be ensured across the response of various lengths (e.g., the response including both short and long texts). Therefore, implementations of the present disclosure may be scalable and applicable to the response of various lengths, which may ensure versatility across the response of various or different lengths.

The performance improvement factor value may be computed based on preferred keywords and preferred response style, which have been specified by a user based on specific task requirements and objectives. The preferred keywords and the preferred response style may be given more preference during evaluation of the evaluation aspects and further prioritized while evaluating for the most effective prompt. The performance improvement factor value may be combined with the score value to compute an optimal score value through multiple iterations of evaluating the prompt, and results of each iteration may be stored. By considering both the semantic meaning and the presence of preferred keywords in the response, implementations of the present disclosure may provide user-tailored evaluation of the prompt, while considering characteristics of the specific task or domain.

The prompt compression and benchmarking may involve reducing a token size of the prompt at each iteration and maintaining a benchmark of a current iteration (e.g., token size, usage of GPU, and/or the like) for a future evaluation. Thereby, in the subsequent iteration of evaluation, only a prompt which aligns with the benchmark of a previous iteration may be considered for improvement.

Therefore, implementations of the present disclosure may provide a structured and analytical approach for evaluating the effectiveness of the prompt with the following advantages:

Comprehensive evaluation framework: Implementations of the present disclosure provide a comprehensive evaluation framework that performs evaluation of the prompt to provide holistic assessment of effectiveness of the prompt.

Evaluation of the prompt may include detailed evaluation of both the prompt and the associated response.

Objective evaluation: Consideration of the multiple evaluation aspects (e.g., measurement metrics) for evaluating the effectiveness of the prompt may define specific criteria and scoring mechanisms. The specific criteria and scoring mechanisms may enable consistent and reliable evaluations across different prompts and tasks. Thereby, the proposed evaluation may ensure data-driven decisions rather than relying solely on intuition or subjective judgements.

Feedback based effective iterative engineering process: Implementations of the present disclosure may enable continuous refining or auto tuning of the prompt based on feedback derived from each iteration of evaluating the prompt. The feedback may identify areas in the prompt for improvement and prioritize optimization of the prompt. Refining or auto tuning of the prompt based on the feedback may foster continuous improvement and optimization of the prompt over time, leading to enhanced performance and efficacy. Further, the feedback in combination with the optimal score value may accelerate a learning curve for the user. For example, the feedback may provide a direction for optimization of the prompt, which may aid the user to quickly learn elements in the prompt that are contributing to the effectiveness of the prompt. In addition, the feedback derived from each iteration may be used to train the LLM for further improvement.

Quantitative scoring methodology: Implementation of the present disclosure may utilize quantitative scoring methodologies to compute the optimal score value for the prompt and/or the corresponding response, which may quantify the effectiveness of the prompt through numerical ratings. By quantifying the effectiveness of the prompt through the numerical ratings may provide a robust basis for evaluation of the prompt.

Efficient resource allocation: Computation of the optimal score value may aid in efficient allocation of computing resources for evaluation of the prompt, while ensuring the most effective prompt for a specific response.

Enhanced user experience: The most effective and optimized prompt may contribute to an enhanced user experience. By providing such a prompt, the user may likely to have positive interactions with the LLM, which may lead to improved user satisfaction and engagement.

Reduced cost: Implementations of the present disclosure may reduce a level of learning from multi shot learning to one shot or two shot learning by reducing iterations of evaluating the prompt. Therefore, cost associated with generating the response using the LLM may be reduced.

Improvement in energy consumption: Implementations of the present disclosure may reduce a number of tokens in the effective prompt by maintaining a quality of the response. Reduction in the number of tokens in the prompt may reduce energy consumption, while contributing to cost savings and sustainability. For example, in the known method of evaluating the effectiveness of the prompt, energy consumed for a prompt (e.g., "Answer the below question about India as a country, what is the capital of India?") of token size 17 may be 7.09-Megawatt Hour (mWH). In contrast, with the proposed implementations, the token size of the prompt may be reduced from 17 to 8 (e.g., a modified prompt with the token size 8 may include "Which city is the capital of India?") and accordingly energy consumption may be reduced from 7.09 mWH to 3.34 mWH.

Figure 7:
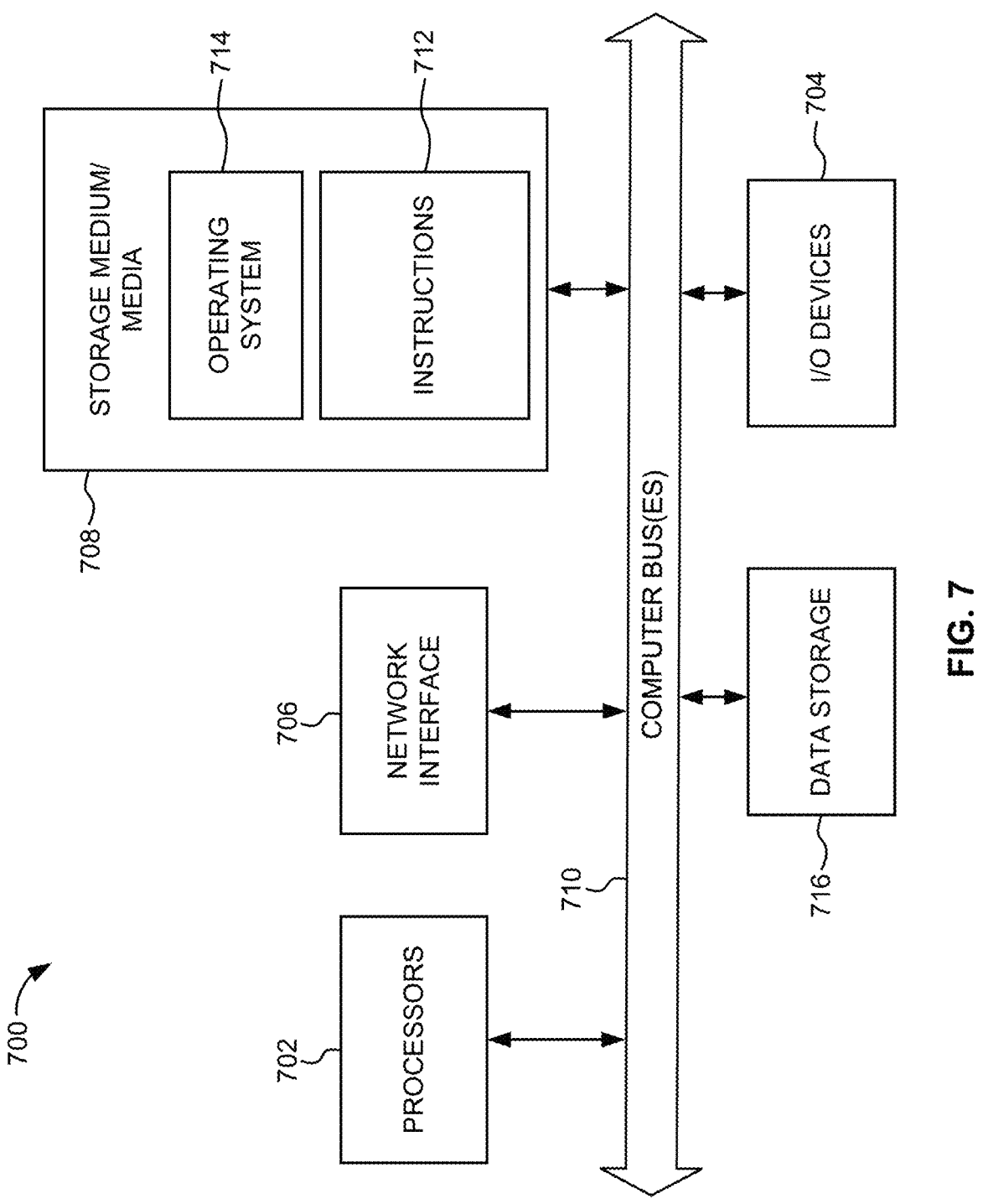
FIG. 7 depicts an example computer system to implement the system, in accordance with implementations of the present disclosure.

FIG. 7 depicts a computer system 700 that may be used to implement the system 102. More particularly, computing machines such as desktops, laptops, smartphones, tablets, and wearables which may be used to evaluate effectiveness of the prompt. The computer system 700 may include additional components not shown and that some of the process components described may be removed and/or modified. In another example, a computer system 700 may be deployed on external-cloud platforms such as cloud, internal corporate cloud computing clusters, organizational computing resources, and/or the like.

The computer system 700 includes processor(s) 702, such as a central processing unit, ASIC or another type of processing circuit, input/output devices 704, such as a display, mouse keyboard, etc., a network interface 706, such as a Local Area Network (LAN), a wireless 802.11x LAN, a 3G or 4G mobile WAN or a WiMax WAN, and a computer-readable medium 708. Each of these components may be operatively coupled to a bus 710. The computer-readable medium 708 may be any suitable medium that participates in providing instructions to the processor(s) 702 for execution. For example, the computer-readable medium 708 may be non-transitory or non-volatile medium, such as a magnetic disk or solid-state non-volatile memory or volatile medium such as RAM. The instructions or modules stored on the computer-readable medium 708 may include machine-readable instructions 712 executed by the processor(s) 702 that cause the processor(s) 702 to perform the methods and functions of the system 102.

The system 102 may be implemented as software stored on a non-transitory processor-readable medium and executed by the processor(s) 702. For example, the computer-readable medium 708 may store an operating system 714, such as MAC OS, MS WINDOWS, UNIX, or LINUX, and code, for the system 102. The operating system 714 may be multi-user, multiprocessing, multitasking, multithreading, real-time, and the like. For example, during runtime, the operating system 714 is running and the code for the system 102 is executed by the processor(s) 702.

The computer system 700 may include a data storage 716, which may include non-volatile data storage. The data storage 716 stores any data used or generated by the system 102.

The network interface 706 connects the computer system 700 to internal systems for example, via a LAN. Also, the network interface 706 may connect the computer system 700 to the Internet. For example, the computer system 700 may connect to web browsers and other external applications and systems via the network interface 706.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. Generally, a computer also includes or is operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor(s) 702 and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:

receiving input data for generating a prompt for receiving a response using a large language model (LLM);

generating, based on the input data, a plurality of sub-prompts, wherein each sub-prompt of the plurality of sub-prompts corresponds with the prompt for receiving the response using the LLM; and performing a series of operations for a sub-prompt of the plurality of sub-prompts, the series of operations including:

generating a sub-response corresponding to the sub-prompt using the LLM;

converting the sub-response to a respective matrix of a plurality of matrices, based on Latent Semantic Analysis (LSA);

evaluating each evaluation aspect of a plurality of evaluation aspects corresponding to the sub-response based on the respective matrix of the plurality of matrices to measure an effectiveness of the sub-prompt in generating the response, wherein evaluation of each evaluation aspect of the plurality of evaluation aspects comprises:

computing a score value corresponding to each respective matrix of the plurality of matrices;

computing, based on the score value corresponding to each respective matrix of the plurality of matrices, a combined score value corresponding to each evaluation aspect of the plurality evaluation aspects, wherein computing the combined score value corresponding to each evaluation aspect comprises:

computing, based on the sub-response and the input data, a performance improvement factor value for the sub-prompt, wherein the performance improvement factor value is based upon a keyword score value and a style similarity score value;

computing, based on the respective score value computed corresponding to each evaluation aspect and the performance improvement factor value, the combined score value corresponding to each evaluation aspect;

wherein computing the performance improvement factor value for the sub-prompt comprises:

analyzing the sub-response to determine:

presence of a plurality of preferred keywords, wherein the preferred keywords are specified by a user in the input data; and similarity of the sub-response to a preferred response style, wherein the preferred response style is specified by the user in the input data; and generating, based upon the analyzing, the keyword score value and the style similarity score value;

computing, based on the combined score value, an optimal score value corresponding to the sub-response corresponding to the evaluation aspect; and determining whether the optimal score value corresponding to the sub-response exceeds a predetermined threshold value;

determining, based upon the optimal score exceeding the predetermined threshold value, the sub-prompt as an effective prompt for generating the response using the LLM corresponding to the input data; and generating, based upon the optimal score is less than the predetermined threshold value, feedback to refine the sub-prompt of the plurality of sub-prompts, wherein the sub-prompt is refined by refining coverage, structure, and occurrence of the plurality of preferred keywords based on the feedback generated for the sub-prompt.

2. The computer-implemented method of claim 1, further comprising repeating the series of operations for another sub-prompt of the plurality of sub-prompts upon determining the optimal score value fails to exceed the predetermined threshold value.

3. The computer-implemented method of claim 1, wherein the keyword score value is generated based upon a respective weightage assigned to each preferred keyword of the plurality of preferred keywords.

4. The computer-implemented method of claim 1, wherein the preferred response style includes one of a professional response style, a creative response style, or a friendly response style.

5. The computer-implemented method of claim 1, wherein the plurality of evaluation aspects comprises clarity, relevance, hallucination, domain knowledge, and/or consistency.

6. The computer-implemented method of claim 1, wherein the input data includes a plurality of preferred keywords, a respective weightage for each preferred keyword of the plurality of preferred keywords, and query information.

7. The computer-implemented method of claim 6, wherein the input data further includes a preferred response style.

8. A system comprising:

at least one memory configured to store machine executable instructions; and at least one processor communicatively coupled with the at least one memory, and configured to execute the machine executable instructions to:

receive input data for generating a prompt for receiving a response using a large language model (LLM);

generate, based on the input data, a plurality of sub-prompts, wherein each sub-prompt of the plurality of sub-prompts corresponds with the prompt for receiving the response using the LLM; and perform a series of operations for a sub-prompt of the plurality of sub-prompts, the series of operations including:

generating a sub-response corresponding to the sub-prompt using the LLM;

converting the sub-response to a respective matrix of a plurality of matrices, based on Latent Semantic Analysis (LSA);

evaluating each evaluation aspect of a plurality of evaluation aspects corresponding to the sub-response based on the respective matrix of the plurality of matrices to measure an effectiveness of the sub-prompt in generating the response, wherein evaluation of each evaluation aspect of the plurality of evaluation aspects comprises:

computing a score value corresponding to each respective matrix of the plurality of matrices;

computing, based on the score value corresponding to each respective matrix of the plurality of matrices, a combined score value corresponding to each evaluation aspect of the plurality of evaluation aspects, wherein computing the combined score value corresponding to each evaluation aspect comprises:

computing, based on the sub-response and the input data, a performance improvement factor value for the sub-prompt, wherein the performance improvement factor value is based upon a keyword score value and a style similarity score value;

computing, based on the respective score value computed corresponding to each evaluation aspect and the performance improvement factor value, the combined score value corresponding to each evaluation aspect, wherein computing the performance improvement factor value for the sub-prompt comprises:

analyzing the sub-response to determine:

presence of a plurality of preferred keywords, wherein the preferred keywords are specified by a user in the input data; and similarity of the sub-response to a preferred response style, wherein the preferred response style is specified by the user in the input data; and generating, based upon the analyzing, the keyword score value and the style similarity score value;

computing, based on the combined score value, an optimal score value corresponding to the sub-response corresponding to the evaluation aspect; and determining whether the optimal score value corresponding to the sub-response exceeds a predetermined threshold value;

determining, based upon the optimal score exceeding the predetermined threshold value, the sub-prompt as an effective prompt for generating the response using the LLM corresponding to the input data; and generating, based upon the optimal score is less than the predetermined threshold value, feedback to refine the sub-prompt of the plurality of sub-prompts, wherein the sub-prompt is refined by refining coverage, structure, and occurrence of the plurality of preferred keywords based on the feedback generated for the sub-prompt.

9. The system of claim 8, wherein the at least one processor is further configured to execute the machine executable instructions to repeat the series of operations for another sub-prompt of the plurality of sub-prompts upon determining the optimal score value fails to exceed the predetermined threshold value.

10. The system of claim 8, wherein the keyword score value is generated based upon a respective weightage assigned to each preferred keyword of the plurality of preferred keywords.

11. The system of claim 8, wherein the preferred response style includes one of a professional response style, a creative response style, or a friendly response style; and wherein the plurality of evaluation aspects comprises clarity, relevance, hallucination, domain knowledge, and/or consistency.

12. The system of claim 8, wherein the input data includes a plurality of preferred keywords, a respective weightage for each preferred keyword of the plurality of preferred keywords, and a query information.

13. The system of claim 12, wherein the input data further includes a preferred response style.

14. A non-transitory computer-readable media (CRM) for storing machine executable instructions stored thereon, which, when executable by at least one processor of a computing device, cause the computing device to execute the machine executable instructions to:

receive input data for generating a prompt for receiving a response using a large language model (LLM);

generate, based on the input data, a plurality of sub-prompts, wherein each sub-prompt of the plurality of sub-prompts corresponds with the prompt for receiving the response using the LLM; and perform a series of operations for a sub-prompt of the plurality of sub-prompts, the series of operations including:

generating a sub-response corresponding to the sub-prompt using the LLM;

converting the sub-response to a respective matrix of a plurality of matrices, based on Latent Semantic Analysis (LSA);

evaluating each evaluation aspect of a plurality of evaluation aspects corresponding to the sub-response based on the respective matrix of the plurality of matrices to measure an effectiveness of the sub-prompt in generating the response, wherein evaluation of each evaluation aspect of the plurality of evaluation aspects comprises:

computing a score value corresponding to each respective matrix of the plurality of matrices;

computing, based on the score value corresponding to each respective matrix of the plurality of matrices, a combined score value corresponding to of each evaluation aspect of the plurality of evaluation aspects, wherein computing the combined score value corresponding to each evaluation aspect comprises:

computing, based on the sub-response and the input data, a performance improvement factor value for the sub-prompt, wherein the performance improvement factor value is based upon a keyword score value and a style similarity score value;

computing, based on the respective score value computed corresponding to each evaluation aspect and the performance improvement factor value, the combined score value corresponding to each evaluation aspect, wherein computing the performance improvement factor value for the sub-prompt comprises:

analyzing the sub-response to determine:

presence of a plurality of preferred keywords, wherein the preferred keywords are specified by a user in the input data; and similarity of the sub-response to a preferred response style, wherein the preferred response style is specified by the user in the input data; and generating, based upon the analyzing, the keyword score value and the style similarity score value;

computing, based on the combined score value for evaluation of each evaluation aspect, an optimal score value corresponding to the sub-response; and determining whether the optimal score value corresponding to the sub-response exceeds a predetermined threshold value;

determining, based upon the optimal score exceeding the predetermined threshold value, the sub-prompt as an effective prompt for generating the response using the LLM corresponding to the input data; and generating, based upon the optimal score is less than the predetermined threshold value, feedback to refine the sub-prompt of the plurality of sub-prompts, wherein the sub-prompt is refined by refining coverage, structure, and occurrence of the plurality of preferred keywords based on the feed-back generated for the sub-prompt.

*    *    *    *    *